United States Patent [19]

Sorace et al.

[11] Patent Number: 4,526,128
[45] Date of Patent: Jul. 2, 1985

[54] HIGH-SPEED INDEXING FEED SCREW CONVEYER

[75] Inventors: Joseph Sorace, Huntington Valley, Pa.; George Wright, Center Barnstead, N.H.

[73] Assignee: Advanced Tech Tool, Ltd., Huntingdon Valley, Pa.

[21] Appl. No.: 579,434

[22] Filed: Feb. 13, 1984

[51] Int. Cl.³ .................... B05B 7/06; B05C 5/00
[52] U.S. Cl. .................... 118/314; 118/313; 118/317; 118/318; 118/320; 118/503; 118/DIG. 3; 198/625
[58] Field of Search ............ 118/313, 314, 317, 318, 118/319, 320, 500, 503, DIG. 3; 198/625, 676, 343, 663, 608, 660, 475, 669, 671, 803

[56] References Cited

U.S. PATENT DOCUMENTS

| | | | |
|---|---|---|---|
| 2,175,255 | 10/1939 | Chapman | 198/475 |
| 2,259,748 | 10/1941 | Hullhorst | 198/676 |
| 2,756,864 | 7/1956 | Laxo | 198/625 |
| 2,961,094 | 11/1960 | Bentley | 198/343 |
| 3,012,650 | 12/1961 | Carter | 198/625 |
| 3,507,382 | 4/1970 | Wells | 198/625 |
| 3,791,508 | 2/1974 | Osbourne et al. | 198/676 |
| 4,068,450 | 1/1978 | Easter | 198/676 |
| 4,263,338 | 4/1981 | Rentmeester et al. | 427/375 |

FOREIGN PATENT DOCUMENTS 1256178  3/1960  France ................. 198/475

Primary Examiner—Shrive P. Beck
Attorney, Agent, or Firm—Gregory J. Gore

[57] ABSTRACT

A vertical-feed conveyor for cylindrical objects and the like utilized twin counter-rotating helical feed screws. The thread of the feed screws is shaped so as to create conveyance troughs which are closely dimensioned to the object to be moved. The variable pitch of the screws creates zones of acceleration, deceleration and dwell so that the objects may be sequentially delivered to predetermined indexing stations where various processes may be performed upon the objects such as; internal spray coating, capping, electronic non-destructive testing, etc. The points of dwell along the feed screws are achieved by the shape of the radial sidewalls of the feed screws which at those points extend part way around the screw in radial planes of the screw.

9 Claims, 6 Drawing Figures

HIGH-SPEED INDEXING FEED SCREW CONVEYER

BACKGROUND OF THE INVENTION

1. Field of the Invention

This invention relates to Manufacturing machinery for conveying cylindrical containers to and from stations or indexing points where the container's movement is stopped for a fixed period of time but specifically to feed screws for conveying the containers to and from the aforementioned stations. Machines for carrying out this conveyance system are widespread and in common use in various applications. These include: container inspection, container labeling, container internal coating and external coating, and in many other process applications. The aforementioned processes are applied or performed upon the containers indexed at process stations described by the conveyance mechanism wherein the container stops its progress, is indexed for a certain dwell time and thereafter, once the progress has been completed, the container is moved away from the station.

2. Prior Art

Relative to a specific application mentioned further herein, prior art internal spray coating machines incorporate roller cam indexing units to impart intermittent motion to the container in order to allow sufficient dwell time for the spraying operation. The indexing units are equipped with turrets containing approximately six pockets to accept and accurately deliver the can to the spray position. Such a machine is disclosed in the U.S. patent to Pierson, U.S. Pat. No. 2,341,477. The turrets weight approximately 15 to 18 lbs. and are one of the limiting factors in being able to obtain higher operating speeds. For example, in such a spray machine which would normally be rated at 150 to 200 cans per minute the roller cam indexing units are not capable of higher inertial loads exerted on the cam rollers and bearings which generally fatigue within a few months to a year of continuous 24 hour service.

SUMMARY OF THE INVENTION

The object of this invention is to provide a conveyance mechanism for cylindrical containers that will be applicable to container internal coating as well as container inspection and other operations normally performed upon containers in the usual industrial setting, and also provide the minimum amount of complexity, floor space, initial cost maintenance and downtime to maximize its cost effectiveness.

It is another object of the instant invention to provide a container conveyance system which accurately indexes and controls the movement of the containers so that where increased speed is required, the device will maintain the adequate amount of movement control to permit the fastest possible running of the conveyance machine.

It is another object of the instant invention to create a device which utilizes a gravity feed vertical delivery conveyance system to eliminate the complexity of the device, reduce costs and reduce the amount of floor space required for installation of the machine.

The machine comprises two vertically-mounted helical feed screws which turn in opposite direction with threads cut thereon to be mutually compatible for grasping the cylinders to be moved. The tolerance of the respective dimensions are close enough so that the screws perform the dual function of conveyance and indexing while the screws turn at a constant speed. Along their length, the threads are cut into both screws so that the containers may be stopped and indexed at one or more stations for a fixed dwell time so that various operations may be performed on the containers as may be desired.

These twin feed screws along with the vertical support bed and the guide bar are the only elements coming into contact with the containers required for positively controlling the movement. While somewhat similar results may have been obtained by using only one vertical feed screw in association with a side guide bar, this method does not produce the adequate amount of container support required by this arrangement and must be supplemented by separate indexing means so that higher operating speeds may be achieved. The twin counter-rotating vertical feed screws are unique and a novel feature of this machine and one which gives it significant advantages over other feed screw conveyance mechanisms especially high speed operation.

The mating of the feed screws forms a tightly fitted, deeply cut, containment pocket which surrounds the cylindrical container and permits fast and accurate container movement. The cylindrical containers are contacted by these screws along the locus of two lines on either side of the container rather than being contacted at a number of points as in prior art examples. This is accomplished by shaping the feed screw thread so that between the threads deeply cut conveyance troughs are formed along the feed screw permitting the high speed and indexing advantages of the instant invention.

This conveyance mechanism is particularly well suited to the internal spray coating of containers such as beverage cans. In one embodiment of the invention as further presented herein, an internal spray coating machine is constructed using this unique conveyance method in cooperation with spray gun apparatus well known in the field of container coating. In this one embodiment, the conveyance mechanism is designed to create two spray coating stations wherein the containers are sequentially moved along the length of the screws stopping at both of these stations for a particular dwell time while the spraying process may be accomplished.

The spraying process requires that the cans be rotated about their axis at the station and this is accomplished through the use of rotating chucks which are either magnetically or vacuum operated in order to effect the turning of the containers at the spray stations. This design results in a wet-on-wet coating process with a process rate of approximately 280 cans per minute. Furthermore, as will be readily discernable from the following descriptions, the vertical orientation of the machine requires very little floor space. Also, the vertical feed screws providing natural spacing between the containers so that there is never any contact between adjacent containers. Furthermore, in this embodiment, all machine elements except for the reciprocating spray gun are constant velocity components. There is no other accelerating or decelerating of machine elements or mechanisms which are most often points of high stress and wear. Accordingly, this machine requires very little lubrication and continuing maintenance. It should also be understood that the vertical feed screws may be cut to any practical length and many process stations may be created. The internal coating spray apparatus may easily be replaced by, for instance, an electronic non-destructive testing apparatus for inspection of the external and internal purposes of each container. The amount of dwell time is limited by the screw speed and is approximated by 180 degrees of feed screw revolution.

It is, of course, necessary that the rotation of the vertical screws be synchronized with the movement of the respective process apparatus such as spray nozzles that will be operating upon the cans at each indexing station. This may be achieved through either electrical or mechanical mechanisms well known in the industrial arts.

DESCRIPTION OF THE PREFERRED EMBODIMENT

Figure 1:
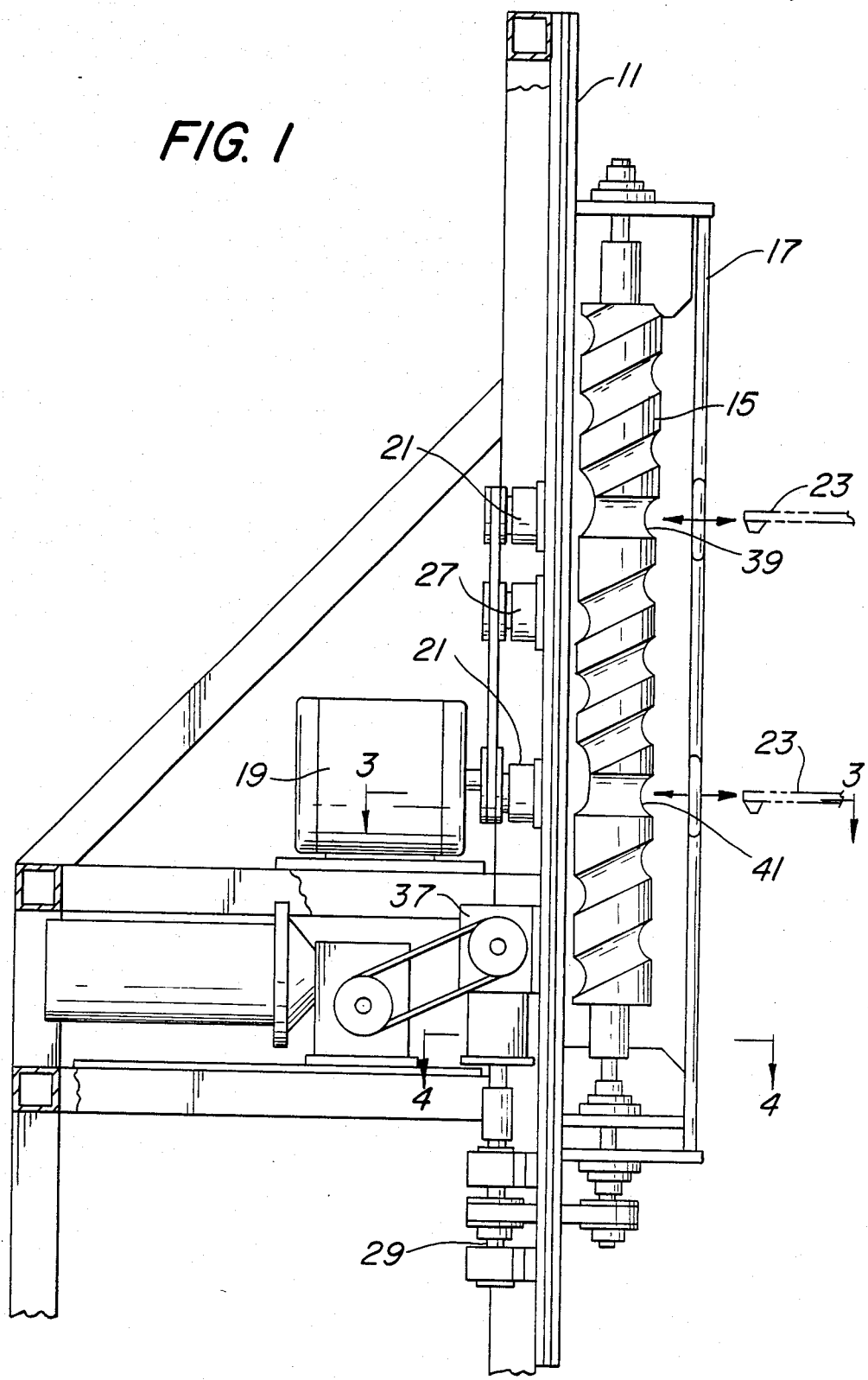
FIG. 1 is a side view which shows the major machine elements as well as spray apparatus located at two indexing stations.
Figure 2:
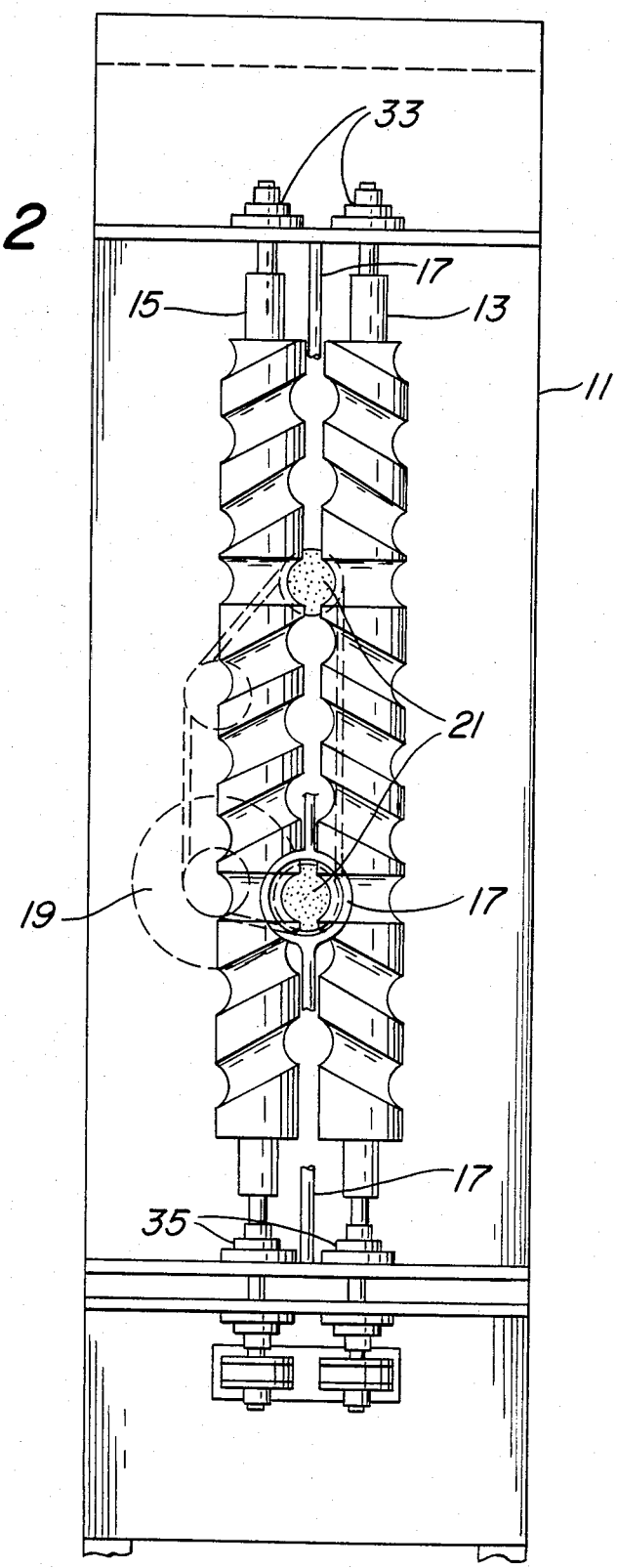
FIG. 2 is a front elevation showing the mounting of the two helical feed screws and their mounting in vertical orientation on the vertical support bed.
Figure 3:
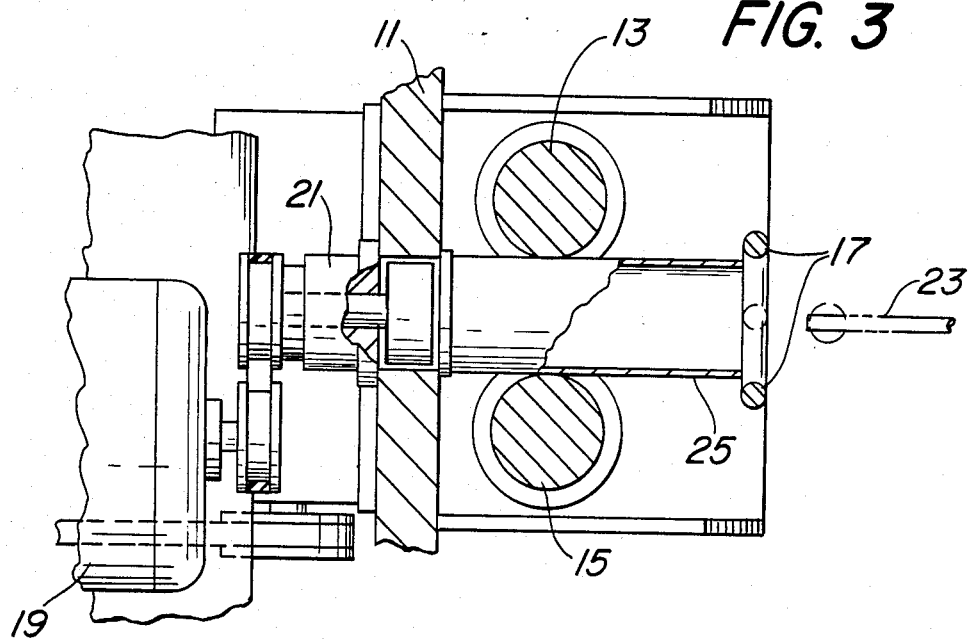
FIG. 3 is a sectional view of FIG. 1 showing details of the feed screw and container at an indexing point.

In the FIGS. 1 and 2 are shown the parallel feed screws 13 and 15 which are supported by top bearing blocks 33 and bottom bearing blocks 35. Both screws are belt driven by shafts 27 and 29 which synchronize their rotation and provide counter-rotation of the two screws at a 1:1 ratio. As can be seen in FIG. 2, both screws have helical threads cut to conform to the surface of the container to be moved. In this embodiment, the screws are shown with threads fashioned to closely accept cylindrical containers. The dimension and proximity of the screws demonstrate the novel wraparound containment of each container which provides accurate control for each container's movement. The degree of container control is determined by the tolerance between the cylindrical containers and the radial sidewalls of the screws. Vertical support bed 11 supports the feed screw bearing blocks as well as providing a flat guide which impinges on the bottom of the containers as seen in FIG. 3. Guide bar 17 similarly impinges upon the tops of the containers so that each container is held within these four elements.

In this embodiment, a machine is fitted with two spray stations having spray guns 23. Both top and bottom spray apparatus are mounted to the vertical support bed and further form a continuation of the guide bar apparatus. Cans are released from the machine through a discharge shute at the bottom of the machine. At the top of the machine is a supply of containers which are gravity fed through guide means into engagement with the vertical feed screws at their uppermost points. Feed and discharge shutes are not illustrated.

Figure 4:
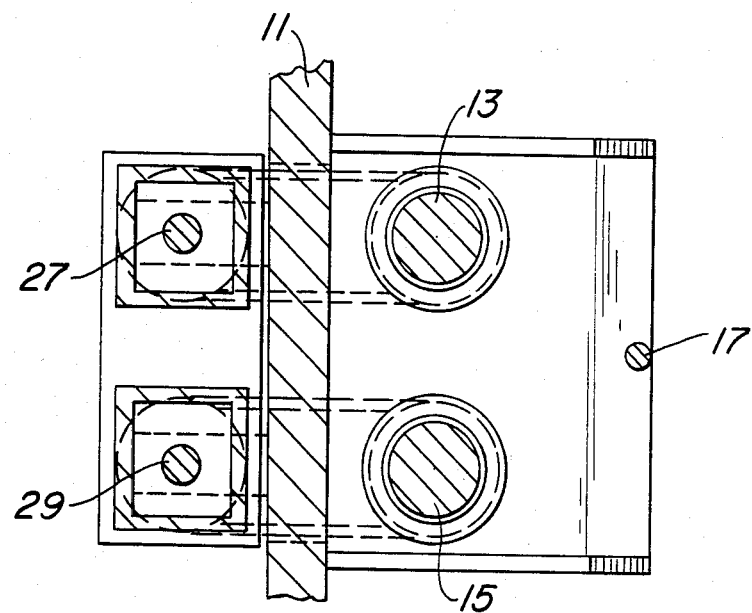
FIG. 4 is a sectional view of FIG. 2 showing details of the drive shafts and drive belts which control the speed and synchronized counter rotation of the feed screws.

The twin helical screws are driven through a typical motor drive having a gear box 37 which drives two vertical shafts 27 and 29 which are then coupled by two belts to the bottom of the helical screws 13 and 15. This drive mechanism synchronizes at 1:1 counter-rotating relationship between the two feed screws. FIGS. 3 and 4 show greater detail of this drive system.

Figure 6:
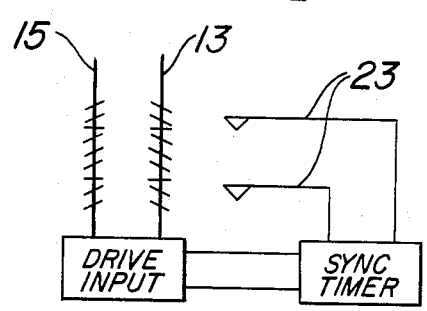
FIG. 6 is a schematic diagram showing the inter-position of the synchronizing means between the spray apparatus and the rotation of the feed screws.

In FIG. 3 a magnetic chuck is shown which is mounted contiguous with the face of the vertical support bed and constantly rotated by drive means 19 which is mounted on the opposite side of the vertical support bed 11. As each container is moved into the first indexing station, the bottom of each container contacts the magnetic chuck and is rotated thereby while the spraying apparatus performs its function. Suitable synchronizing means are interposed between the feed screws and the spray means as illustrated in schematic diagram, FIG. 6. After a predetermined dwell time at the first station, the container is then moved away from the station and thereafter into the second spraying station in the manner similar to the operation performed at the first station. Thereafter, the container is moved away from the second spray station and then continues downward away from the machine.

Figure 5:
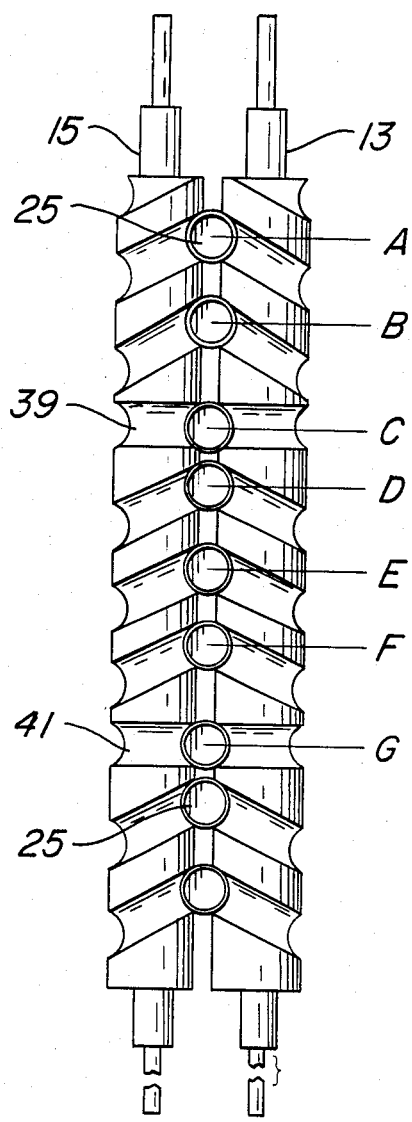
FIG. 5 shows a number of containers positioned at two indexing points and at points of acceleration and deceleration along the conveyance path.

As illustrated in FIG. 5, threads are cut into the feed screws so that as a container approaches an indexing station, travelling between points A and B, it is accelerated between points B and C then stopped abruptly at indexing point C where the screw's radial sidewalls extend part way around the screws in radial planes of the screws. It dwells there for a predetermined time and thereafter is quickly accelerated away from that station travelling between points C and D up to a constant speed between points D and E. Similarly, at each successive indexing station, such as G, the cans are accelerated into the indexing station and after sufficient dwell time are accelerated out of the indexing station. This variable acceleration principle as applied along the length of the feed screws is accomplished by cutting the screw threads so that the pitch varies to create the zones of acceleration or deceleration as described in FIG. 5. The dwell time at indexing points is accomplished by cutting the threads so that radial sidewalls of the conveyance trough formed within the thread cavity extend partway around the screws in radial planes of the screws at these points. Furthermore, the thread troughs are shaped to provide a tight, wraparound containment of the cylindrical object so that there is sufficient movement control for the screws to provide the dual function of conveyance and indexing. This allows the containers to be picked up by the feed screws at a constant rate and discharged from the feed screws at the same rate, yet allowing the necessary intermittent motion at intermediate points along the conveyance path.

It should be readily understood by those of ordinary skill in the art that this machine may be adapted to have any number of spray stations should greater coating be required. Similarly, the spraying apparatus may be replaced by other process apparatus to perform various other functions such as: capping, non-destructive electronic testing, external coating, etc.

Although a preferred embodiment of the instant invention has been specifically illustrated and described herein, it is understood that minor variations may be made therein within the spirit and scope of the invention as defined by the appended claims.

What is claimed is:

1. A cylindrical container conveyance and indexing machine, comprising;
   (a) a vertical support bed,
   (b) a first vertical helical feed screw rotatably mounted on the vertical support bed,
   (c) a second helical feed screw rotatably mounted on the vertical support bed parallel to the first helical feed screw with threads cut thereon symmetrical to the thread of the first feed screw, and positioned proximate to the first feed screw so that conveyance troughs are formed between opposite facing radial sidewalls of both screws, said conveyance troughs being shaped such that when cylindrical objects occupy the troughs they contact both radial sidewalls along two lines across the surface of the cylindrical object, said feed screws having at least one area along their length where the sidewalls extend partway around the screws in radial planes of the screws to stop temporarily the movement of the cylindrical object, and
   (d) drive means which rotate and synchronize the feed screws in a 1:1 counter-rotating relationship.

2. A cylindrical container conveyance and indexing machine, comprising:
   (a) a vertical support bed,
   (b) a first vertical helical feed screw rotatably mounted on the vertical support bed,
   (c) a second and final helical feed screw mounted parallel to the first helical feed screw rotatably on the vertical support bed with threads cut thereon symetrical to the helical threads of the first feed screw, and positioned proximate to the first feed screw so that conveyance troughs are formed between opposite facing radial sidewalls of only two screws which are shaped to contact containers along two lines across their surface;
   (d) synchronizing means connecting the first feed screw to the second feed screw whereby both feed screws are linked in a one-to-one counter-rotating relationship;
   (e) a guide bar mounted on the vertical mounting bed which is positioned between the feed screws to contain the path of containers travelling therebetween;
   (f) a first indexing point along the length of the feed screws;
   (g) first spray coating means positioned along the path between the two feed screws at the first indexing point;
   (h) synchronizing means between the first spray coating means and the feed screws;
   (i) a second indexing point along the length of the feed screws;
   (j) a second spray coating means positioned along the path between the two feed screws, at the second indexing point;
   (k) synchronizing means between the second spray coating means and the feed screws; and
   (l) drive means for turning the feed screws such that cylindrical containers travelling in the conveyor troughs therebetween are moved along the line of the feed screws being accelerated as they move into each indexing point and accelerated away from each indexing point after pausing a predetermined amount of dwell time at said indexing points by the side walls of the feed screws which beside said indexing points, extend partway around the screws in radial planes of the screws.

3. The container conveying and indexing machine described in claim 2 further including means for rotating the cylindrical containers about their axis affixed to said vertical support bed at the first and second indexing points.

4. The container conveying and indexing machine as described in claim 3 further including a magnetic chuck affixed to said means for rotating the cylindrical objects which holds the cylindrical objects in frictional communication with said means of rotation.

5. A beverage can conveyance and indexing machine, comprising;
   (a) a vertical support bed,
   (b) a first vertical helical feed screw rotatably mounted on the vertical support bed,
   (c) a second helical feed screw rotatably mounted on the vertical support bed parallel to the first helical feed screw with threads cut thereon symetrical to the thread of the first feed screw, and positioned proximate to the first feed screw so that conveyance troughs are formed between opposite facing radial sidewalls of both screws, said conveyance troughs being shaped such that when cylindrical objects occupy the troughs they contact both radial sidewalls along two lines across the surface of the cylindrical object, said feed screws having at least one area along their length where the sidewalls extend partway around the screws in radial planes of the screws to stop temporarily the movement of the cylindrical object,
   (d) drive means which rotate and synchronize the feed screws in a 1:1 counter-rotating relationship.

6. A beverage can conveyance and indexing machine, comprising;
   (a) a vertical support bed,
   (b) a first vertical helical feed screw rotatably mounted on the vertical support bed,
   (c) a second and final helical feed screw mounted parallel to the first helical feed screw rotatably on the vertical support bed with threads cut thereon symetrical to the helical threads of the first feed screw, and positioned proximate to the first feed screw so that conveyance troughs are formed between opposite facing radial sidewalls of only two screws which are shaped to contact containers along two lines across their surface;
   (d) synchronizing means connecting the first feed screw to the second feed screw whereby both feed screws are linked in a one-to-one counter-rotating relationship;
   (e) a guide bar mounted on the vertical mounting bed which is positioned between the feed screws to contain the path of containers travelling therebetween;
   (f) a first indexing point along the length of the feed screws;
   (g) first spray coating means positioned along the path between the two feed screws at the first indexing point;
   (h) synchronizing means between the first spray coating means and the feed screws;
   (i) a second indexing point along the length of the feed screws;
   (j) a second spray coating means positioned along the path between the two feed screws, at the second indexing point;
   (k) synchronizing means between the second spray coating means and the feed screws; and (l) drive means for turning the feed screws such that cylindrical containers travelling in the conveyor troughs therebetween are moved along the line of the feed screws being accelerated as they move into each indexing point and accelerated away from each indexing point after pausing a predetermined amount of dwell time at said indexing points by the side walls of the feed screws which beside said indexing points extend partway around the screws in radial planes of the screws.

7. A beverage can conveyance and indexing machine, comprising;

(a) a vertical support bed, (b) a first vertical helical feed screw rotatably mounted on the vertical support bed, (c) a second helical feed screw mounted parallel to the first helical feed screw rotatably mounted on the vertical support bed with threads cut thereon symetrical to the helical threads of the first feed screw, and positioned proximate to the first feed screw so that conveyance troughs are formed between opposite facing radial sidewalls of both screws;

(d) synchronizing means connecting the first feed screw to the second feed screw whereby both feed screws are linked in a one-to-one counter-rotating relationship;

(e) a guide bar mounted on the vertical mounting bed which is positioned between the feed screws to contain the path of containers travelling therebetween;

(f) a first indexing point along the length of the feed screws;

(g) first spray coating means positioned along the path between the two feed screws at the first indexing point;

(h) synchronizing means between the first spray coating means and the feed screws;

(i) a second indexing point along the length of the feed screws;

(j) a second spray coating means positioned along the path between the two feed screws, at the second indexing point;

(k) synchronizing means between the second spray coating means and the feed screws; and (l) drive means for turning the feed screws such that cylindrical containers travelling in the conveyor troughs therebetween are moved along the line of the feed screws being accelerated as they move into each indexing point and accelerated away from each indexing point after pausing a predetermined amount of dwell time at said indexing points by the sidewalls of the feed screws which beside said indexing points extend partway around the screws in radial planes of the screws.

8. A conveyance machine, comprising;

(a) a vertical support bed;

(b) no more or less than two helical feed screws parallel to each other and mounted vertically on said support bed such that conveyance troughs are formed between said screws and further characterized in that the sole vertical support for articles conveyed in said troughs is provided by said screws; and (c) drive means for turning and synchronizing the feed screws.

9. The container conveying and indexing machine described in claim 8 further including non-destructive electronic testing means located on said vertical support bed.

* * * * *